United States Patent [19]
Yoshii et al.

[11] Patent Number: 5,643,127
[45] Date of Patent: Jul. 1, 1997

[54] VEHICLE POWER TRANSMISSION HAVING FLUID-TIGHT ENCLOSURE ACCOMMODATING LUBRICATING POINTS AND STORING LUBRICATING OIL DELIVERED FROM MECHANICAL OIL PUMP

[75] Inventors: Kinya Yoshii; Eiji Ichioka; Takeharu Koide, all of Toyota; Yoshihiko Sasaki, Okazaki, all of Japan

[73] Assignees: Toyota Jidosha Kabushiki Kaisha, Toyota; Aisin AW Co., Ltd., Anjo, both of Japan

[21] Appl. No.: 609,916

[22] Filed: Feb. 29, 1996

[30] Foreign Application Priority Data

Mar. 6, 1995 [JP] Japan ................................ 7-045423
May 25, 1995 [JP] Japan ................................ 7-126412

[51] Int. Cl.$^6$ .......................... F16H 1/00; F16H 57/04; B60K 17/346
[52] U.S. Cl. ......................... 475/160; 74/467; 184/6.12
[58] Field of Search ........................ 74/467; 184/6.12; 475/159, 160

[56] References Cited

U.S. PATENT DOCUMENTS

| | | | |
|---|---|---|---|
| 5,158,152 | 10/1992 | Nemoto et al. | 184/6.12 |
| 5,279,391 | 1/1994 | Ward | 74/467 |
| 5,372,213 | 12/1994 | Hasebe et al. | 184/6.12 |

FOREIGN PATENT DOCUMENTS

0 443 901 A1  8/1991  European Pat. Off. .
5-89061     12/1993  Japan .

*Primary Examiner*—Dirk Wright
*Attorney, Agent, or Firm*—Oblon, Spivak, McClelland, Maier, Neustadt, P.C.

[57] ABSTRACT

A motor vehicle power transmission system whose rotating elements are all stopped upon stopping of the vehicle, and which comprises a lubricating device including an oil sump for storing a lubricating oil and a mechanically operated oil pump which is driven by one of the rotating elements to deliver the pressurized lubricating oil to predetermined lubricating points such as bevel gears of a differential gear device. The lubricating device has a substantially fluid-tight enclosure in which the lubricating points are disposed and which stores, in a substantially fluid-tight manner, a mass of the lubricating oil delivered from the oil pump.

10 Claims, 8 Drawing Sheets

VEHICLE POWER TRANSMISSION HAVING FLUID-TIGHT ENCLOSURE ACCOMMODATING LUBRICATING POINTS AND STORING LUBRICATING OIL DELIVERED FROM MECHANICAL OIL PUMP

BACKGROUND OF THE INVENTION

1. Field of the invention

The present invention relates in general to a motor vehicle power transmission in which all rotating members are at rest when a motor vehicle is stopped, and more particularly to a lubricating device for such a vehicle power transmission, which uses a mechanical oil pump driven by a rotating member of the power transmission.

2. Discussion of the Related Art

A motor vehicle power transmission system including a speed changing or reducing device and a differential gear device is equipped with a lubricating device for lubricating various rotating members disposed therein, so as to protect bearing portions and mutually meshing portions of the rotating members from seizure and early wearing. There have been proposed various types of such a lubricating device for the vehicle power transmission system. One example of the known lubricating device is a so-called "oil bath lubricating device", wherein bearings and other portions of the power transmission system to be lubricated (hereinafter referred to as "lubricating points" where appropriate) are immersed in a bath of a lubricating oil and are thus lubricated by the oil during operation of the power transmission. Another example of the known lubricating device is a so-called "forced-feed lubricating device", wherein the lubricating oil is pressurized, and the pressurized oil is fed to the lubricating points. Two types of the forced-feed lubricating device are known, namely, a mechanically operated forced-feed lubricating device and an electrically operated forced-feed lubricating device. In the mechanically operated forced-feed lubricating device, an oil pump for delivering the pressurized lubricating oil is driven by an appropriate rotating member of the power transmission system. In the electrically operated forced-feed lubricating device, an electrically operated pump is employed to deliver the pressurized lubricating oil.

In the oil-bath lubricating device as described above, the lubricating oil is agitated or stirred and scattered by the rotating members of the power transmission system when these rotating members are rotated. Accordingly, the motor vehicle tends to undesirably suffer from a relatively large energy loss when the vehicle is running at a comparatively high speed. When this oil-bath lubricating device is used in an electric motor vehicle, for example, the travel distance or mileage of the vehicle per one battery charging is undesirably reduced. Further, the lubricating oil is likely to be overheated, leading to bubbling and early deterioration of the oil, which may cause easy leakage of the oil.

Unlike the oil-bath lubricating device, the mechanical forced-feed lubricating device is not likely to suffer from a large energy loss. In the electric motor vehicle, however, all of the rotating members are at rest when the vehicle is stopped. Accordingly, a mechanical oil pump which is driven by a rotating member of the power transmission is turned off upon stopping of the electric motor vehicle, and therefore the lubricating oil is no more supplied to the lubricating points in the transmission system. This means that the power transmission system cannot be adequately lubricated upon restarting of the vehicle after a stop.

Described in detail, upon starting of the vehicle, the power transmission system starts to be rotated and accordingly, the oil is delivered by the mechanical pump and gradually supplied to the lubricating points. However, it takes some time before the oil reaches the lubricating points. Upon and immediately after starting of the vehicle, the rotating speed of the power transmission system is relatively low, and accordingly the amount of the lubricating oil delivered from the pump is small. However, a large amount of the lubricating oil is required to sufficiently lubricate the transmission system upon and immediately after starting of the vehicle, since a comparatively large torque is transmitted to the power transmission system, and an accordingly large amount of load acts on the bearing and meshing portions of the transmission system. When the vehicle wheels slip on the road surface upon starting of the vehicle, the gears of the differential gear device are rotated at a high speed with a large amount of load acting thereon, and therefore a large amount of lubricating oil is required to lubricate the gears.

In the electrically operated forced-feed lubricating device, an electrically operated oil pump is capable of delivering the lubricating oil to the lubricating points, irrespective of the rotating speed of the power transmission system. Thus, the electrically operated forced-feed lubricating device is preferably employed for an electric motor vehicle wherein all rotating members of the power transmission system are turned off upon stopping of the vehicle. However, this lubricating device which requires an electric motor for driving the electric oil pump suffers from a shorter service life, and requires more frequent inspection and replacement of the components, than the mechanically operated forced-feed lubricating device. For the electrically operated forced-feed lubricating device to provide a sufficient lubricating effect upon starting of the vehicle, the electric pump motor should be kept in the operating state so as to enable the lubricating oil to be continuously delivered from the oil pump to the lubricating points even while the vehicle is at a stop, since an operation of an accelerator pedal by the vehicle operator to restart the vehicle is unexpected. In this case, the electric power consumed by the electric pump motor for continuous operation of the oil pump is generally larger than the energy loss experienced in the mechanically operated forced-feed lubricating device wherein the mechanical pump is driven by a rotating member of the power transmission system.

Figure 9:
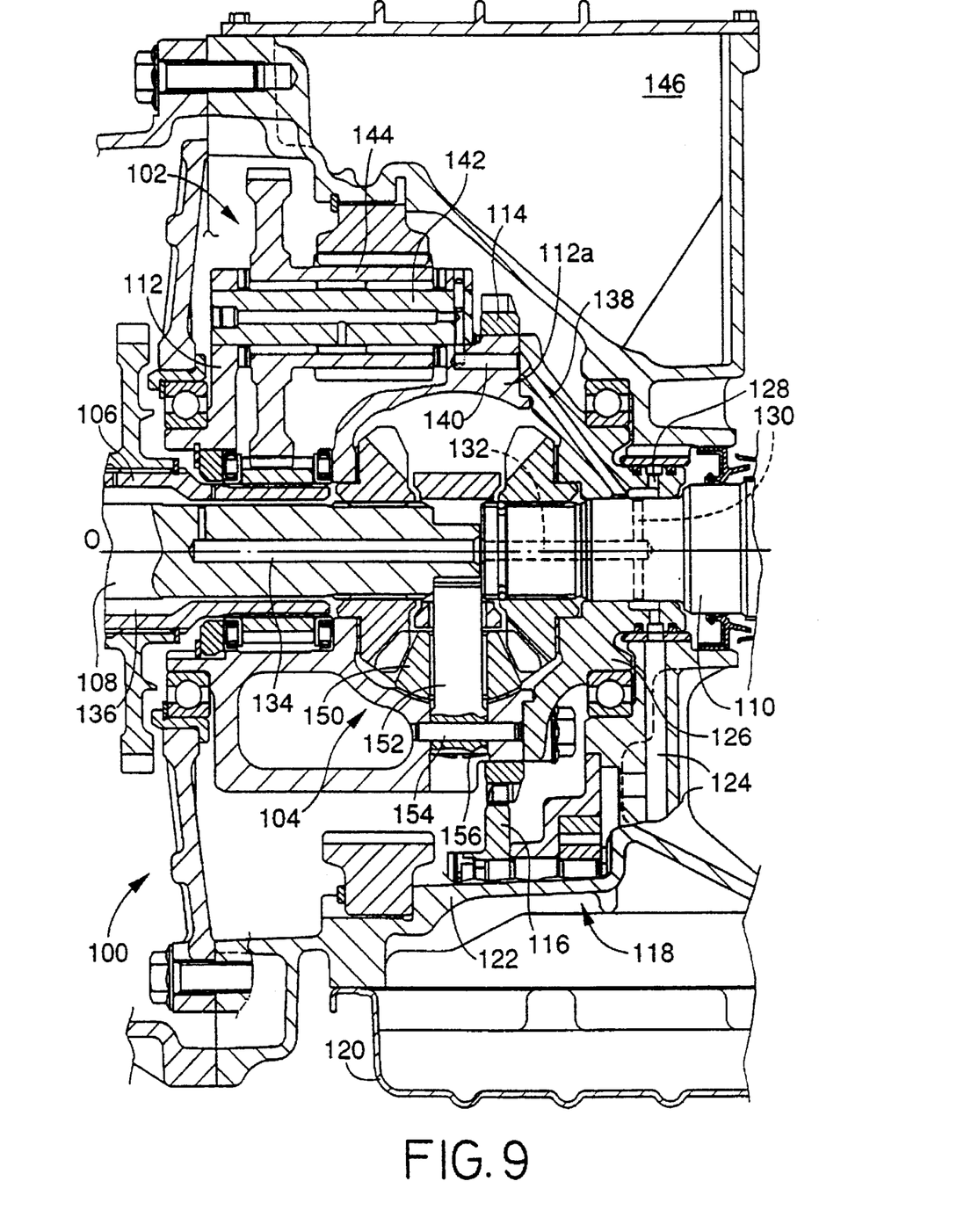
FIG. 9 is a fragmentary elevational view of a power transmission system over which an improvement according to the present invention was made.

Japanese Patent Application No. 6-190253 (filed Aug. 12, 1994), which has not been laid open at the time the present invention was made, discloses a power transmission system including a lubricating device, wherein oil-bath lubrication is effected during running of the vehicle at a relatively low speed, while forced-feed lubrication using a mechanical oil pump is effected during running of the vehicle at a relatively high speed. Further, an excess of the lubricating oil delivered from the mechanical pump during running of the vehicle at a high speed is stored in an oil reservoir, so as to reduce the level of the oil in the housing of the transmission system for thereby preventing an energy loss due to agitation of the oil by the rotating members rotating at a high speed. An example of this type of power transmission system for an electric motor vehicle is generally indicated at 100 in FIG. 9. This power transmission system 100 has an axis of rotation or centerline O, and includes a speed reducing device 102 of planetary gear type and a differential gear device 104 of bevel gear type, which are disposed concentrically or coaxially with the centerline O. A rotary motion of an output shaft 106 of an electric motor, which is shown in a left-hand side part of FIG. 9, is transmitted to a left and a right drive wheel of the electric motor vehicle via the speed reducing device 102, differential gear device 104 and a pair of output members 108, 110 of the power transmission 100. Thus, the motor shaft 106 serves as an input shaft of the transmission system 100. The speed of the motor shaft 106 is reduced by the speed reducing device 102 before the motion is transmitted to the differential gear device 104. The speed reducing device 102 has a carrier 112 which includes a differential casing portion 112a that constitutes a part of the casing of the differential gear device 104. A pump drive gear 114 is fixed to the outer circumferential surface of the differential casing portion 112a, so that a mechanical oil pump 118 in the form of a trochoid pump is driven by the drive gear 114 through a driven gear 116.

The lubricating oil sucked up from an oil sump 120 and pressurized by the mechanical pump 118 is supplied into the casing of the differential gear device 104 (partially constituted by the differential casing portion 112a), via an oil passage 124 formed in a housing 122 of the power transmission system, an annular oil passage 128 formed in a differential cover 126, and radial and axial oil passages 130, 132, that are formed in the output member 110, so that the bearing and meshing portions of the gears of the differential gear device 104 are lubricated by the lubricating oil delivered from the mechanical oil pump 118. A portion of the oil supplied to the axial oil passage 132 is further fed through an oil passage 134 formed in the output member 108, and an annular oil passage 136 formed between the output member 108 and the motor shaft 106, so that the bearings and other portions of the motor shaft 106 and output member 108 are lubricated. The oil is further fed to the electric motor for cooling this motor, and is returned back to the oil sump 120. A portion of the oil supplied to the oil passage 128 is further fed to three pinion shafts 142 fixed to the carrier 112, through oil passages 138 formed in the differential cover 126, and oil passages 140 formed in the differential casing portion 112a of the carrier 112, so that the bearing portions of three stepped composite pinion gears 144 mounted on the respective pinion shafts 142 are lubricated. In the present lubricating system, three sets of oil passages 138 and 140 are provided for the three pinion shafts 142, respectively.

The housing 122 has an oil reservoir 146 for storing an excess of the lubricating oil supplied to the oil passage 124. The amount of the lubricating oil in the housing 122 is determined such that the level of the oil when the vehicle is at rest is in the neighborhood of the centerline O, so that the rotating members of the power transmission system 100 are lubricated primarily by oil-bath lubrication immediately after starting of the vehicle and during running of the vehicle at a relatively low speed. During running of the vehicle at a medium or high speed, a sufficient amount of the lubricating oil is delivered from the mechanical pump 118 to the lubricating points such as the bearing portions of the gears of the differential gear device 104 and the bearing portions of the composite pinion gears 144 of the speed reducing device 102. When the amount of delivery of the mechanical pump 118 exceeds a given upper limit due to a rise of the vehicle running speed, the lubricating oil begins to be fed into the oil reservoir 146, and the level of the oil bath within the housing 122 is accordingly lowered, eventually to a level lower than the lower ends of the speed reducing device 102 and differential gear device 104. Thus, the transmission system 100 is sufficiently lubricated by oil-bath lubrication during starting and low-speed running of the vehicle, and at the same time an otherwise possible energy loss due to agitation of the oil during high-speed running of the vehicle is effectively prevented. The oil stored in the oil reservoir 146 slowly drops by gravity down to the lubricating points, and can be utilized to lubricate the transmission system 100 immediately after starting of the vehicle following a comparatively short stop.

In the lubricating device as disclosed in FIG. 9, however, it takes a considerable time until a large amount of the lubricating oil is stored in the oil reservoir, particularly where the vehicle running speed is raised from a low level to a high level at a comparatively high rate. In this case, it requires a long time until the level of the oil in the housing is lowered enough to avoid an energy loss due to agitation of the oil by the rotating members of the transmission system. Accordingly, this lubricating device inevitably suffers from some amount of energy loss. Further, the provision of the oil reservoir results in an increase in the cost of the lubricating device, and an increase in the required size of the housing including the reservoir, whereby the ease of installation of the transmission system on the vehicle is deteriorated. In this respect, it is noted that a large amount of lubricating oil is required to permit sufficient lubrication of the transmission system during starting of the vehicle, and that the oil reservoir should have a sufficiently large oil storage capacity to assure elimination of the energy loss due to agitation of the oil during high-speed running of the vehicle.

SUMMARY OF THE INVENTION

It is therefore an object of this invention to provide a motor vehicle power transmission system including a lubricating device which is adapted to effect forced-feed lubrication using a mechanical pump, and which assures sufficient lubrication of the power transmission system over a wide range of vehicle running speed (from a low to a high speed), without using a large oil reservoir, while preventing an energy loss due to agitation of the lubricating oil.

The above object may be achieved according to the principle of the present invention, which provides a power transmission system for a motor vehicle, in which all of rotating elements thereof are stopped upon stopping of the vehicle, and which comprises a lubricating device including an oil sump for storing a lubricating oil and a mechanically operated oil pump which is driven by one of the rotating elements to pressurize the lubricating oil received from the oil sump and deliver the pressurized lubricating oil to predetermined lubricating points within the power transmission system, the power transmission system being characterized in that the lubricating device has a substantially fluid-tight enclosure in which the lubricating points are disposed, and that the substantially fluid-tight enclosure stores, in a substantially fluid-tight manner, a mass of the lubricating oil pressurized by and delivered from the mechanically operated oil pump.

In the power transmission system of the present invention constructed as described above, the lubricating points are accommodated in the substantially fluid-tight enclosure and the pressurized lubricating oil delivered from the mechanically operated oil pump is stored in this enclosure in a substantially fluid-tight manner. In this arrangement, the lubricating points are sufficiently lubricated by the oil stored in the substantially fluid-tight enclosure, not only during running of the vehicle at a relatively high speed, but also during starting of the vehicle following a comparatively long stop or during running of the vehicle at a relatively low speed. Since the lubricating points are accommodated in the enclosure to be filled with the lubricating oil, the lubricating oil is not agitated by the rotating members outside the enclosure, whereby an energy loss due to such oil agitation is prevented.

As indicated above, the lubricating device of the present power transmission system permits sufficient lubrication of the lubricating points over a wide range of the vehicle running speed, without oil-bath lubrication known in the art. Accordingly, the present system is completely free from an energy loss due to agitation of the lubricating oil, which occurs under some condition when an oil reservoir is provided for storing an excess of the lubricating oil delivered by the mechanically operated oil pump during high-speed running of the vehicle. Further, the provision of the substantially fluid-tight enclosure according to the present invention eliminates such an oil reservoir. In the absence of the oil reservoir, the present power transmission system can be made smaller and simpler in construction, leading to easier installation thereof on the motor vehicle and reduced cost of manufacture thereof.

According to one preferred form of this invention, the power transmission system further comprises a differential gear device of a bevel gear type which has a casing and a plurality of bevel gears which are disposed in the casing as the lubricating points, and the substantially fluid-tight enclosure is defined within the casing.

In one advantageous arrangement of the above form of the invention, the differential gear device further comprises a plurality of gear shafts supported by the casing and intersecting an axis of rotation of the power transmission system, and the bevel gears includes a plurality of driving bevel gears freely rotatably mounted on the respective gear shafts, and a plurality of driven bevel gears which are coaxial with the above-indicated axis of rotation and which mesh with the plurality of driving bevel gears.

In the above advantageous arrangement, the lubricating device may further include sealing means such as O-rings or liquid gaskets for substantially fluid-tight sealing between the gear shafts and the casing of the differential gear device. Except when the differential gear device is in a differential operation, the bevel gears in the casing of the differential gear device rotate together with the casing, whereby the lubricating oil in the substantially fluid-tight enclosure will not be unnecessarily agitated by the bevel gears. The casing of the differential gear device may be associated with an input shaft from which power is received by the power transmission system. In this case, the lubricating device may further include second sealing means for substantial fluid-tight sealing between the input shaft and the casing.

In the power transmission system 100 shown in FIG. 9 described above, the differential gear device 104 is lubricated by oil-bath lubrication during and immediately after starting of the vehicle. Therefore, the oil is agitated, resulting in an energy loss. In some situation, the level of the oil bath within the housing 122 has not been lowered enough even when the vehicle running speed has reached a relatively high level. In this case, too, the lubricating oil is undesirably agitated. In the system 100 of FIG. 9, there exists some amount of clearance or gap between the outer circumferential surface of each gear shaft 152 and the inner surface of a radial hole 156 formed in the differential casing portion 112a. During the oil-bath lubrication during starting of the vehicle, the oil is forced into the space within the casing of the differential gear device 104, through the clearance or gap indicated above.

However, the principle of the present invention is applicable to the power transmission system 100. That is, suitable sealing means may be provided between the differential casing 112a and each gear shaft 152, for establishing substantially fluid-tight sealing therebetween according to the present invention.

The above-indicated advantageous arrangement is suitably applicable to an electric motor vehicle. In this case, the power transmission system may further comprise a pair of output members for rotating a pair of wheels of the electric motor vehicle, and a speed reducing device of a planetary gear type which has a carrier coaxial with the axis of rotation of the power transmission system, and a plurality of pinion gears supported by the carrier rotatably about respective axes substantially parallel to the above-indicated axis of rotation. The carrier is adapted to receive power from an electric motor and transmit the received power to the differential gear device at a predetermined speed reduction ratio. The casing of the differential gear device may include a portion which is rotated together with the carrier, so that the power is transmitted to the pair of output members through the driving bevel gears and the driven bevel gears.

According to one preferred feature of the above advantageous arrangement wherein the speed reducing device of planetary gear type and the differential gear device of bevel gear type are provided, the pinion gears are equiangularly arranged about the axis of rotation of the power transmission system while the driving bevel gears are equiangularly arranged about the above-indicated axis of rotation. Further, a first number of the pinion gears and a second number of the driving bevel gears are determined such that one of the first and second numbers is a divisor of the other of the first and second numbers, which divisor is other than "1". In this case, the pinion gears and the driving bevel gears are arranged about the axis of rotation of the power transmission system such that each of the driving bevel gears is disposed without an interference thereof with any of the pinion gears in a direction of rotation about the above-indicated axis of rotation, and the speed reducing device and the differential gear device are positioned relative to each other such that the speed reducing device and the differential gear device at least partially overlap each other in an axial direction parallel to the above-indicated axis of rotation.

When the first number is equal to "2", for example, the second number is also equal to "2", because "2" is the sole divisor of the number "2". Similarly, when the first number is equal to "3" or "5", the second number is also equal to "3" or "5", respectively. When the first number is equal to "4", for example, the second number may be either "4" or "2", because "4" and "2" are both divisors of the number "4".

In the power transmission system according to the above preferred feature of the invention wherein the numbers of the pinion gears of the speed reducing device and the driving bevel gears of the differential gear device are determined as described above, each driving bevel gear may be interposed between the adjacent pinion gears as viewed in the direction of rotation about the axis of rotation of the power transmission system, so as to avoid interference of the driving bevel gears with any pinion gears as viewed in the above-indicated direction of rotation, namely, in the circumferential direction of the carrier. Therefore, the speed reducing device and the differential gear device may be positioned relative to each other such that the axial lengths of these devices at least partially overlap each other. Accordingly, the axial length of the assembly of the speed reducing and differential gear devices can be considerably reduced, leading to reduced size and weight of the power transmission system, and a reduced space required for installation of the power transmission system on the electric motor vehicle.

In a conventional power transmission system, the planetary gear type speed reducing device uses three pinion gears, while the bevel gear type differential gear device uses two or four driving bevel gears. In this arrangement wherein the number of the pinion gears is different from that of the driving bevel gears, it is difficult to arrange the pinion gears and the driving bevel gears about the axis of rotation of the power transmission system such that the speed reducing device and the differential gear device at least partially overlap each other, while avoiding an interference between the pinion gears and the driving bevel gears. If either the pinion gears or the driving bevel gears are not equiangularly arranged about the axis of rotation of the power transmission system, the interference may be avoided even with the two devices partially overlapping in the axial direction. However, this non-equiangular arrangement is not desirable in terms of rotation balance of the power transmission system.

Each of the pinion gears of the speed reducing device may be a composite pinion gear consisting of a large-diameter pinion gear and a small-diameter pinion which has a smaller diameter than the large-diameter pinion. In this instance, the large- and small-diameter pinions are arranged in an axial direction of each pinion gear and are adapted to rotate together when the pinion gear is rotated.

The speed reducing device may be adapted to include a sun gear which is rotated by the electric motor about the above-indicated axis of rotation and which meshes with the large-diameter pinion of each pinion gear, and a stationary ring gear which meshes with the small-diameter pinion of each pinion gear. In this case, it is desirable that the teeth of the large-diameter pinion and the teeth of small-diameter pinion have the same direction of helix and the same amount of lead. This arrangement assures improved parallelism between the composite pinion gear and the sun and ring gears, adequate meshing engagement of the sun and ring gears, and reduced operating noise and increased power transmitting efficiency of the speed reducing device.

BRIEF DESCRIPTION OF THE DRAWINGS

The above and optional objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
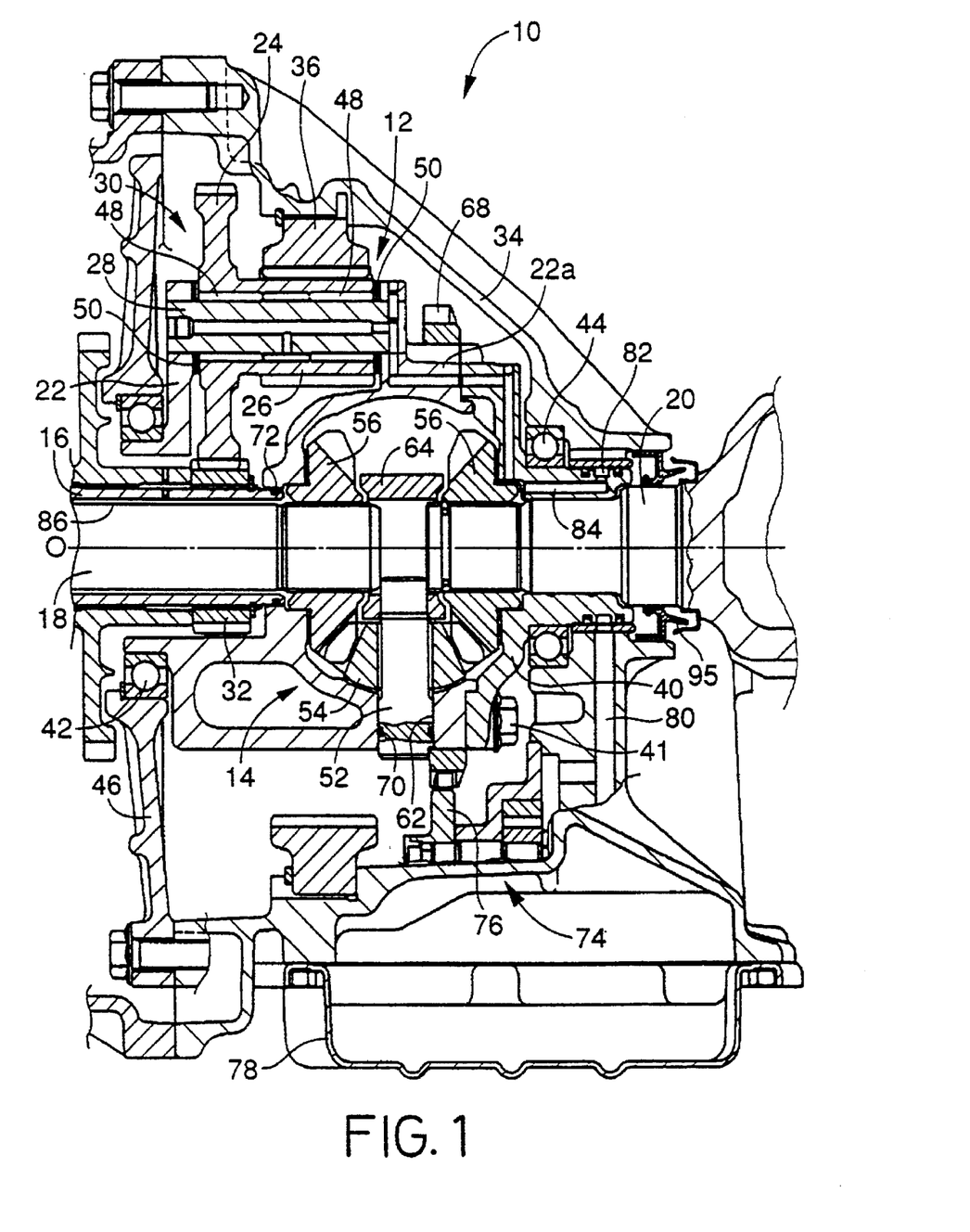
FIG. 1 is a fragmentary elevational view in cross section of a power transmitting system for an electric motor vehicle, which includes a lubricating device constructed according to one embodiment of the invention.

Referring first to FIG. 1, there is shown a power transmission system 100 for an electric motor vehicle. This power transmission system 100 is basically similar in construction to the power transmission system 100 of FIG. 9, except the construction of a lubricating device. The power transmission system 10 has an axis of rotation or centerline O, and includes a speed reducing device 12 of planetary gear type and a differential gear device 14 which are disposed concentrically or coaxially with the centerline O. A rotary motion of an output shaft 16 of an electric motor (not shown), which is shown in a left part of FIG. 1, is transmitted to a left and a right drive wheel of the electric motor vehicle, through the speed reducing device 12, differential gear device 14, and a pair of output members 18, 20. Thus, the motor shaft 16 serves as an input shaft of the transmission system 10. The speed of the rotary motion of the motor shaft 16 is reduced by the speed reducing device 12 before the motion is transmitted to the differential gear device 14. This power transmission system 10 is directly connected to the electric motor via the motor shaft 16, so that the rotating members in the power transmission system 10 are rotated by the motor during running of the vehicle. When the electric motor is turned off upon stopping of the vehicle, all of the components of the power transmission system 10 are also stopped.

The speed reducing device 12 includes a carrier 22, three stepped composite pinion gears 30, a sun gear 32, and a ring gear 36, which are all disposed concentrically or coaxially with each other and the centerline O. The carrier 22 is supported by a housing 34 rotatably about the centerline O. Each of the three composite pinion gears 30 includes a large-diameter pinion 24 and a small-diameter pinion 26 which are formed integrally with each other into a one-piece structure such that the large- and small-diameter pinions 24, 26 are arranged in the axial direction. The three composite pinion gears 30 are freely rotatably mounted on respective three pinion shafts 28 which are equiangularly arranged about the centerline O. The pinion shafts 28 extend substantially in parallel with the centerline O. Namely, the composite pinion gears 30 are rotatable on the respective pinion shafts 28, about respective axes that are substantially parallel with the centerline O. The sun gear 32 is splined to the motor shaft 16 for rotation therewith about the centerline O, and meshes with the large-diameter pinions 24 of the three composite pinion gears 30. The ring gear 36 is fixed to the housing 34 and meshes with the small-diameter pinion gears 26 of the composite pinion gears 30. When the sun gear 32 is rotated by the motor shaft 16, the carrier 22 is rotated at a predetermined speed reduction ratio, with the ring gear 36 as a reaction element.

The carrier 22 has a differential casing portion 22a disposed in the vicinity of the small-diameter pinions 26 of the speed reducing device 12. A differential cover 40 is fixed by bolts 41 to the differential cover 40 such that an open end of the differential casing portion 22a is closed by the differential cover 40. An assembly of the differential casing portion 22a of the carrier 22 and the differential cover 40 cooperate to constitute a casing of the differential gear device 14. This assembly is supported at its axially opposite ends by the housing 34 via a pair of bearings 42, 44, rotatably about the centerline O and immovably in the axial direction. The bearing 42 is supported by a gear cover 46 integrally fixed to the housing 34. Each of the three composite pinion gears 30 is rotatable on the corresponding pinion shaft 28 via a pair of needle bearings 48. Two washers 50 are provided at the axially opposite ends of the pinion shaft 28, whereby the gear 30 is positioned in the axial direction by the carrier 22. However, the composite pinion gear 30 is given a suitable amount of axial clearance or play sufficient to accommodate dimensional and positioning errors of the associated components.

Figure 4:
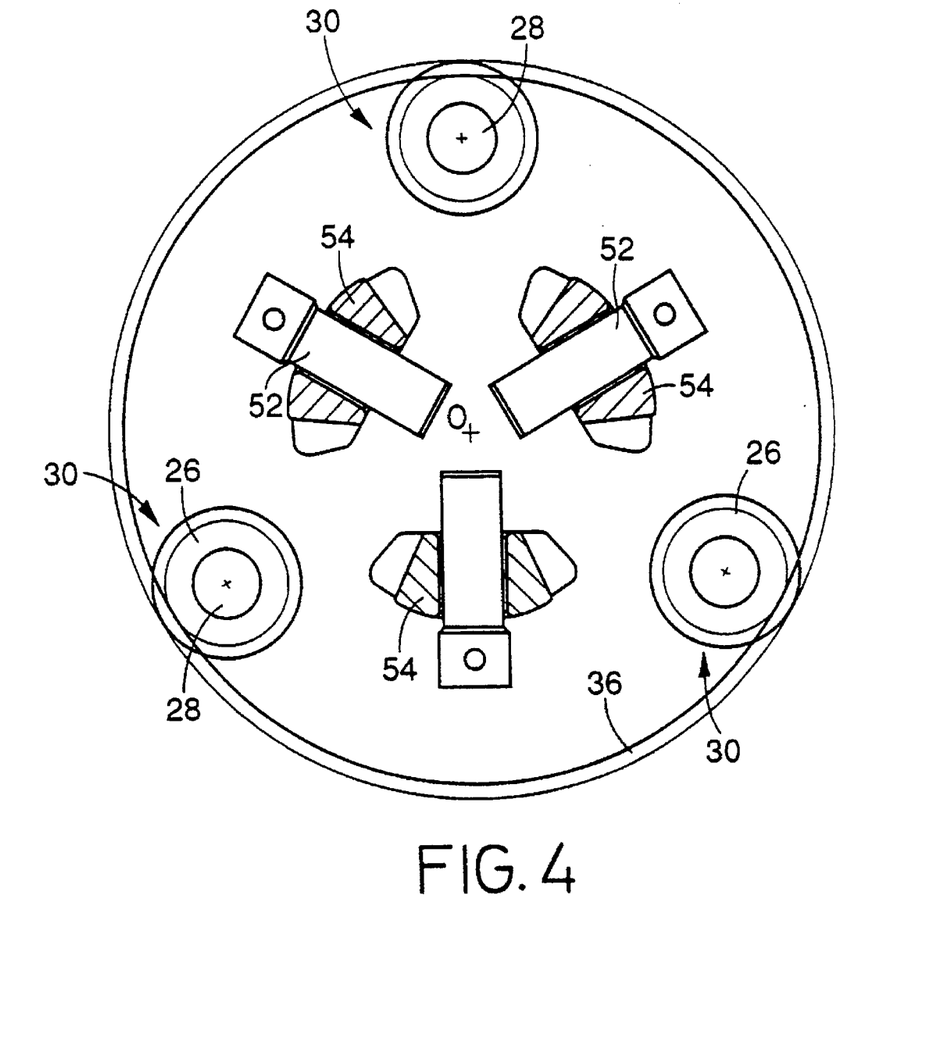
FIG. 4 is a view explaining a positional relationship between composite pinion gears of the speed reducing device and driving bevel gears of the differential gear device of the power transmission system of FIG. 1, which pinion and bevel gears are arranged about a centerline O of the system.

On the other hand, the differential gear device 14 is disposed in the vicinity of the small-diameter pinions 26 of the stepped composite pinion gears 30 of the speed reducing device 12, that is, on the right-hand side of the large-diameter pinions 24 as seen in FIG. 1. As is apparent from the enlarged view of FIG. 2, the differential gear device 14 has three gear shafts 52, three driving bevel gears 54 rotatably mounted on the respective gear shafts 52, and two driven bevel gears 56 which are splined to the respective two output members 18, 20 for rotation therewith and which mesh with the three driving bevel gears 54. The three gear shafts 52 are equiangularly arranged about the centerline O as shown in FIG. 4 such that the gear shafts 52 have axes substantially perpendicular to the centerline O. In other words, the three driving bevel gears 54 accommodated within the casing of the differential gear device 14 are rotatable on the respective gear shafts 52, about respective axes substantially perpendicular to the centerline O. Each driven bevel gear 56 has three teeth so as to facilitate engagement thereof with the three driving bevel gears 54 which are equiangularly arranged about the centerline O. The two output members 18, 20 are disposed in coaxial relationship with the centerline O. The output member 18 extends through the motor shaft 16 in the form of a sleeve and reaches the end of the electric motor remote from the motor shaft 16. The other output member 20 extends through a bore of the differential cover 40 and projects out of the housing 34.

Figure 3A:
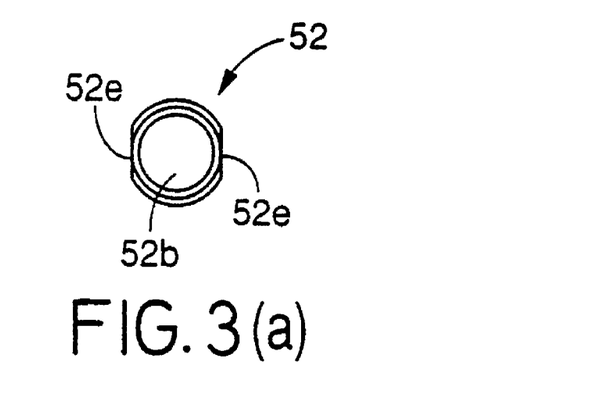
FIG. 3(a) is a left-hand side end view of a gear shaft for supporting a driving bevel gear of the differential gear device of FIG. 2.
Figure 3B:
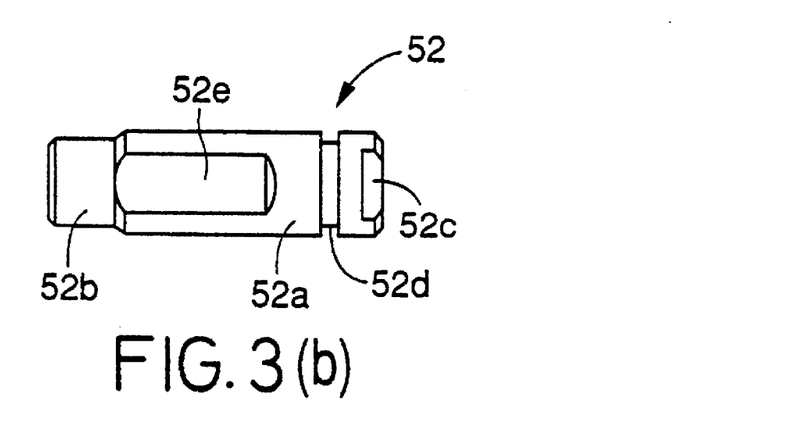
FIG. 3(b) is an front elevational view of the gear shaft of FIG. 3(a)
Figure 3C:
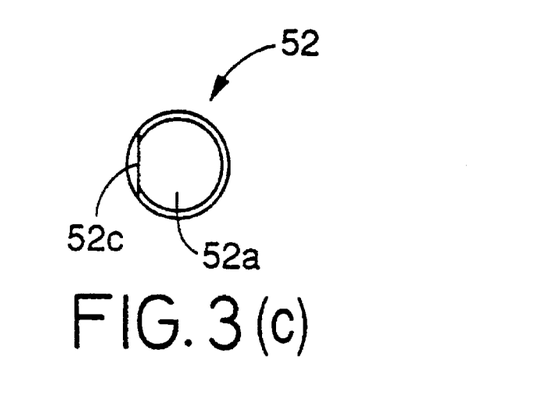
FIG. 3(c) is a right-hand side end view of the gear shaft of FIGS. 3(a) and 3(b)

A part-spherical washer 58 is interposed between each driving bevel gear 54 and the differential casing portion 22a of the carrier 22. A washer 60 in the form of a ring is interposed between the left-hand side driven bevel gear 56 and the differential casing portion 22a, and between the right-hand side driven bevel gear 56 and the differential cover 40. As shown in FIGS. 3(a) and 3(b), each gear shaft 52 uses a stepped cylindrical member including a body portion 52a having a relatively large diameter, and an inner end portion 52b having a relatively small diameter. The gear shaft 52 is positioned in the differential gear device 14 such that the body portion 52a is fitted in a radial hole 62 formed in the differential casing portion 22a, while the inner end portion 52b is inserted in a positioning hole 66 formed in a gear shaft holder 64 in the form of a sleeve. The pinion shaft 28 is positioned in its axial radial direction (radial direction of the device 14) by abutting contact of the end face of the inner end portion 52b with the bottom of the positioning hole 66. As shown in FIGS. 3(b) and 3(c), the gear shaft 52 has a cutout 52c formed in the end face of the body portion 52a.

The gear shaft 52 is positioned about its axis by engagement of the cutout 52c with a pump driving gear 68 which is integrally provided on the outer circumferential surface of the differential casing portion 22a. The gear shaft holder 64 is positioned coaxially with the centerline O, as a result of engagement of the inner end portions 52b of the three gear shafts 52 with the respective positioning holes 66.

Each gear shaft 52 has an annular groove 52d in the body portion 52a. A sealing member in the form of an O-ring 70 is fitted in the annular groove 52d, whereby fluid-tight sealing is provided between the body portion 52a and the radial hole 62 of the differential casing portion 22a of the carrier 22. A sealing ring 72 is provided at the axial end of the motor shaft 16 adjacent to the left-hand side driven bevel gear 56, whereby fluid-tight sealing is provided between the differential casing portion 22a and the motor shaft 16. Since the open end of the differential casing portion 22a is fluid-tightly closed by the differential cover 40 with a close contact therebetween by tightening by the bolts 41, and the O-rings 70 and sealing ring 72 are provided as described below, the lubricating oil introduced in the casing of the differential gear device 14 is inhibited or prevented from flowing out of the casing. That is, the differential casing portion 22a of the carrier 22, differential cover 40, O-rings 70 for the three gear shafts 52 and sealing ring 72 for the motor shaft 16 cooperate to define a substantially fluid-tight enclosure 73 within the casing of the differential gear device 14. The lubricating points such as the bearing and meshing portions of the bevel gears 54, 56 are accommodated in this substantially fluid-tight enclosure 73. As shown in FIGS. 3(a) and 3(b), each gear shaft 52 has a pair of flat faces 52e formed in a part of the body portion 52a which extends into the enclosure 73 and which rotatably supports the driving bevel gear 54. These flat faces 52e permit easy flow of the lubricating oil between the sliding surfaces of the body portion 52a and the driving bevel gear 54.

Figure 2:
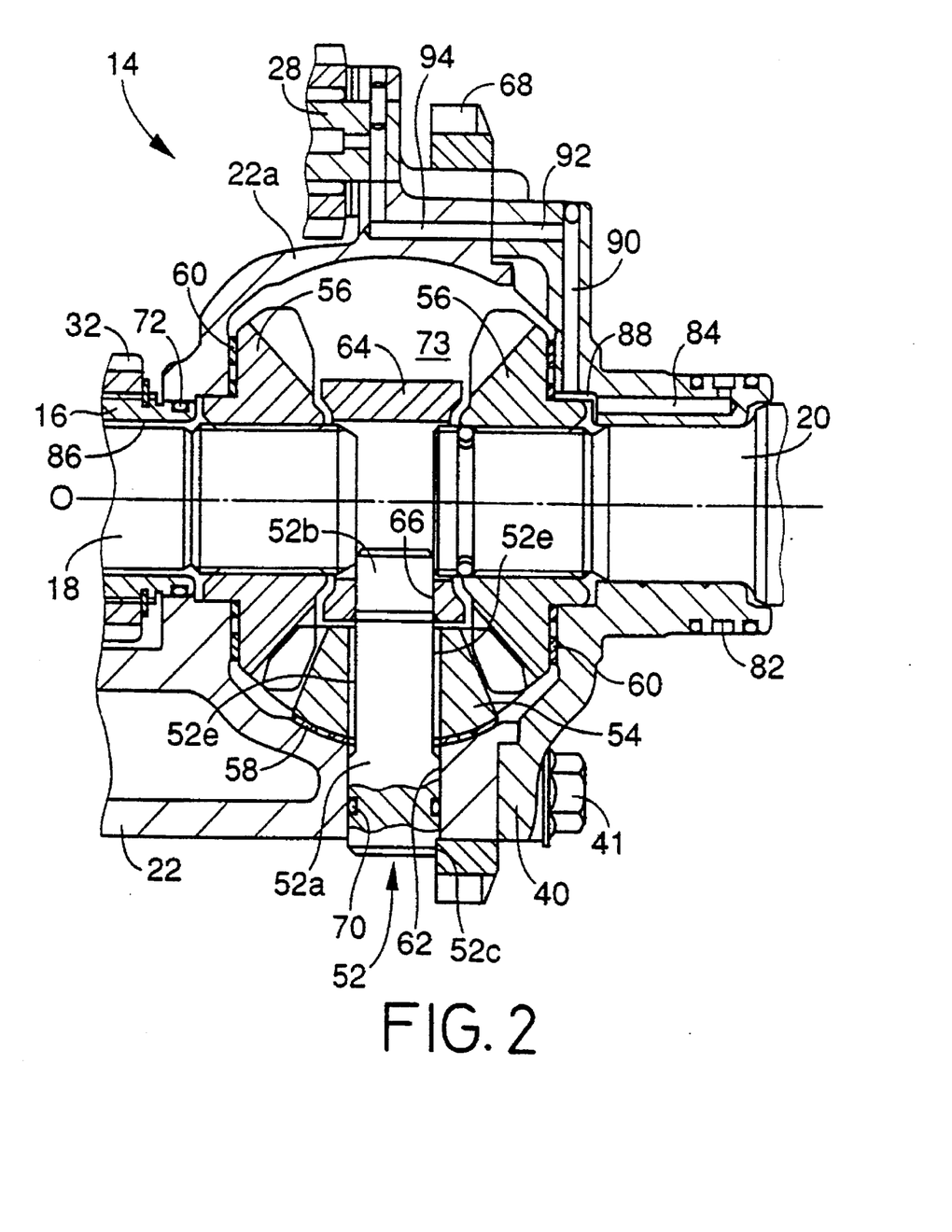
FIG. 2 is an enlarged view of a differential gear device and its vicinity of the power transmission system of FIG. 1.

A mechanical oil pump 74 in the form of a trochoid pump 74 (hereinafter referred to as "mechanical pump") is disposed in a lower portion of the housing 34. This mechanical pump 74 is driven by the pump drive gear 68 via a driven gear 76. The lubricating oil sucked up from an oil sump 78 and pressurized by the mechanical pump 74 is fed into the substantially fluid-tight enclosure 73 of the differential gear device 14 through an oil passage 80 formed in the housing 34, an annular oil passage 82 and an axial oil passage 84 that are formed in the differential cover 40, and gaps formed between the right-hand side driven bevel gear 56 and the output member 20 and differential cover 40. With the pressure of the pressurized lubricating oil in the substantially fluid-tight enclosure 73, a portion of the oil is further fed to the bearings of the motor shaft 16 and output member 18, through gaps between the left-hand side driven bevel gear 56 and the output member 18 and differential casing portion 22a, and an annular oil passage 86 between the output member 18 and the motor shaft 16. The oil is then further fed to the electric motor for cooling this motor, and is returned to the oil sump 78. A portion of the oil supplied to the oil passages 84 is fed to the pinion shafts 28 of the speed reducing device 12, through cutout grooves 88, oil passages 90, 92 that are formed in the differential cover 40, and oil passages 94 formed in the differential casing portion 22a of the carrier 22, as shown in FIG. 2. Thus, the bearing portions of the stepped composite pinion gears 30 are lubricated. Three sets of oil passages 84, 90, 92, 94 and cutout grooves 88 are provided corresponding to the three pinion shafts 28. These three sets are equiangularly arranged about the centerline O.

In the lubricating device of the power transmission system 10 constructed as described above, the casing of the differential gear device 14 is substantially fluid-tightly sealed by the O-rings 70 and sealing ring 72, so as to substantially prevent leakage of the lubricating oil from the substantially fluid-tight enclosure 73 in which a mass of the pressurized oil fed by the mechanical pump 74 is stored. Although some amount of the lubricating oil may leak from the annular oil passage 86 between the motor shaft 16 and output member 18, a gap between the sliding surfaces of the differential cover 40 and output member 20, and oil passages 84, 90, the amount of the oil leakage is extremely small. Namely, the annular oil passage 86 is filled with the oil and has a considerably large length, and the amount of the oil leakage from the passage 86 is very small. Since the gap between the sliding surfaces of the differential cover 40 and output member 20 is very small and is provided with an oil seal 95 as shown in FIG. 1, the amount of the oil leakage from this gap is also very small. Further, since the oil passages 84, 90 are also filled with the oil, the amount of the oil leakage from these oil passages 84, 90 are also very small.

As described above, the lubricating oil can be retained or stored in the substantially fluid-tight enclosure 93 of the differential gear device 14, the bearing portions and meshing portions of the bevel gears 54, 56 of the differential gear device 14 are sufficiently lubricated by the oil which is pressurized and delivered by the mechanical pump 74 into the enclosure 73, not only during running of the vehicle at a relatively high speed, but also during starting of the vehicle following a relatively long stop and during running of the vehicle at a relatively low speed. Since the rotating members of the power transmission system 10 are not immersed in a bath of the lubricating oil, and since the bevel gears 54, 56 as the lubricating points are accommodated in the substantial fluid-tight enclosure 73, the present lubricating device does not suffer from an energy loss due to agitation of the oil by the rotating members. In this respect, it is noted that except in a differential operation of the differential gear device 14, the bevel gears 54, 56 are rotated together with the differential casing portion 22a of the carrier 22, and therefore a mass of the lubricating oil stored in the enclosure 73 is not agitated in the enclosure 73, whereby the oil will not be overheated, and the energy loss due to the agitation of the oil is avoided.

As explained above, the present power transmission system 10 assures sufficient forced-feed lubrication of the rotating members over a wide range of the vehicle running speed, without oil-bath lubrication and without an energy loss due to agitation of the oil, unlike the power transmission system 100 of FIG. 9 which employs the oil reservoir 146 and which tends to suffer from an energy loss due to agitation of the lubricating oil even when the vehicle speed is raised at a high rate. Further, the elimination of an oil reservoir as used in the system 100 assures increased ease of installation of the power transmission system 100 on the vehicle, and leads to structural simplicity and reduced cost of the system. The problem experienced in the system 100 is solved by mere provision of the O-rings 70 and sealing ring 72 to define the substantially fluid-tight enclosure 73 of the differential gear device 14.

While a substantially fluid-tight enclosure is not provided for the composite pinion gears 30 of the speed reducing device 12, the composite pinion gears 30 do not require a large amount of lubricating oil, since the gears 30 are rotatably supported by means of the needle bearings 48, unlike the bevel gears 54, 56 which are slidably supported by the pinion shafts 28 and the output members 18, 20. A delayed supply of the lubricating oil to the composite pinion gears 30 during starting and low-speed running of the vehicle will not cause seizure or early wearing of the gears 30. While the washers 50 are provided at the axially opposite ends of each composite pinion gear 30, these washers 50 may be replaced by thrust bearings, as needed.

Since the substantially fluid-tight enclosure 73 is partially defined by the differential casing portion 22a of the carrier, the differential casing portion 22a can be utilized to define the necessary oil passages. In the present embodiment, the lubricating oil is introduced into the enclosure 73 through the gaps between the right-hand side driven bevel gear 56 and the output member 20 and differential cover 40, and the oil in the enclosure 73 is fed toward the electric motor through the gaps between the left-hand side driven gear 56 and the output member 18 and differential casing portion 22a and through the annular passage 86 between the output member 18 and the motor shaft 16. Thus, the present lubricating device does not require axial oil passages 134, 132 formed in the output members 108, 110 in the lubricating device provided in the system 100 of FIG. 9. Accordingly, the strength of the output members 18, 20 can be increased, or the diameter thereof can be reduced.

The advantage of the increased strength of the output members 18, 20 as described above is not limited to a power transmission system wherein all rotating members are stopped upon stopping of the vehicle, or a power transmission system wherein the mechanical pump 74 for delivering the lubricating oil is driven by one of the rotating members. That is, the substantially fluid-tight enclosure 73 permits the use of an electrically operated oil pump, since this pump need not be continuously operated while the vehicle is at a stop, because a mass of the lubricating oil is stored in the enclosure 73 and can be used during and immediately after restarting of the vehicle. In this case, the control of the electrically operated pump motor is simplified, and the power consumption by the pump motor is reduced.

In the present power transmission system 10, the three composite pinion gears 30 and the three driving bevel gears 54 are rotatably supported by the carrier 22 such that these six gears 30, 54 are equiangularly spaced from each other at 60° angular intervals about the centerline O, namely, in the rotating direction of the motor shaft 16, as shown in FIG. 4. Described more specifically, the three composite pinion gears 30 and the three driving bevel gears 54 are alternately arranged such that each driving bevel gear 54 is interposed between the adjacent two composite pinion gears 30 in the circumferential direction of the ring gear 36. Thus, the pinion gears 30 and the driving bevel gears 54 are arranged about the centerline or axis of rotation O such that each driving bevel gear 54 is disposed without an interference thereof with any of the pinion gears 30 in a direction of rotation about the axis or centerline O. This arrangement permits the driving bevel gears 54 (gear shafts 52) and the composite pinion gears 30 to be positioned relative to each other such that the bevel gears 54 overlap the pinion gears 30 in the axial direction of the motor shaft 16, that is, in the direction parallel to the centerline O, as shown in FIG. 1. In other words, about a half of the axial length (as measured along the centerline O) of the differential gear device 14 overlaps the small-diameter pinions 26 of the speed reducing device 12 in the axial direction so that the gear shafts 52 of the differential gear device 14 partially overlap the pinion shafts 28 of the speed reducing device 12 in the axial direction, as shown in FIG. 1.

Since about the half of the length of the differential gear device 14 overlaps the small-diameter pinions 26 of the speed reducing device 12 in the axial direction along the centerline O, the overall axial dimension and the weight of the power transmission system 10 are considerably reduced, resulting in accordingly reduced space required for installing the system 10 on the motor vehicle. It is also appreciated that the provision of the three driving bevel gears 54 permits a smaller PV value (a product of a surface pressure P and a rotating speed V of the bevel gear 54), than the provision of two driving bevel gears. This arrangement makes it possible to locate the driving bevel gears 54 near the centerline O such that the gears 54 are positioned inside the small-diameter pinions 26 in the radial direction of the carrier 22, whereby the diameter of the differential gear device 14 can be reduced. Consequently, the diameter of the power transmission system 10 can be reduced.

In the present embodiment, the carrier 22 of the speed reducing device 12 cooperates with the differential cover 40 to constitute the casing of the differential gear device 14, which is rotatably supported by the housing 34 via the bearings 42, 44. This arrangement assures a high degree of rigidity necessary to support the speed reducing device 12 and the differential gear device 14, while maintaining a comparatively compact structure as explained above.

In the present power transmission system 10 wherein the number of the composite pinion gears 30 is equal to the number of the driving bevel gears 54, these six gears 30, 54 are alternately and equiangularly arranged about the centerline O, so that the weight is evenly distributed, and the rotation balance is improved, leading to increased power transmission efficiency and reduced vibration and noise generation.

Figure 5:
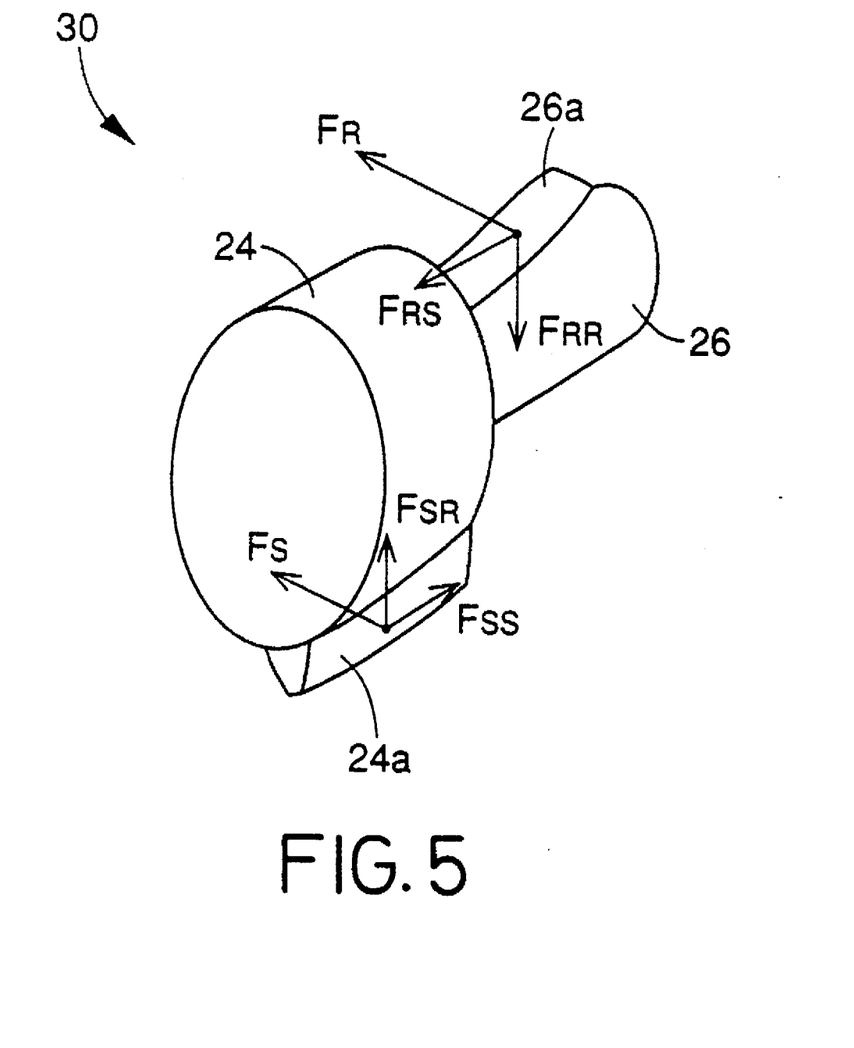
FIG. 5 is a perspective view schematically indicating the profiles of teeth of large- and small-diameter pinions of each composite pinion gear of the speed reducing device.

As shown in FIG. 5, the large-diameter pinion 24 and the small-diameter pinion 26 of each composite pinion gear 30 of the speed reducing device 12 have teeth 24a and 26a. The teeth 24a and the teeth 26a both have a left-hand helix and have the same amount of lead. This arrangement is effective to prevent application of thrust forces to the composite pinion gears 30 due to the helix angle of the teeth 24a, 26a, and permits the three composite pinion gears 30 to be moved in the axial direction independently of each other, thereby assuring adequate meshing of the teeth 24a, 26a with the sun gear 32 and ring gear 36. These aspects will be described below in detail.

The perspective view of FIG. 5 shows forces which act on each stepped composite pinion gear 30 when the gear 30 is rotated by the motor shaft 16 in the counterclockwise direction as seen in the right direction (from the left toward the right) of FIG. 1, that is, when the power transmission system 10 is operated to run the vehicle in the forward direction. In FIG. 5, only one tooth 24a of the large-diameter pinion gear 24 and only one tooth 26a of the small-diameter pinion 26 are shown, in the interest of brevity. As indicated above, the teeth 24a and the teeth 26a both have the left-hand helix and the same amount of lead. When the motor shaft 16 and the sun gear 32 are rotated counterclockwise, a thrust force $F_{SS}$ acts on the large-diameter pinion 24 meshing with the sun gear 32, in the right axial direction as seen in FIG. 1, due to the left-hand helix of the teeth 24a. On the other hand, a thrust force $F_{RS}$ acts on the small-diameter pinion 26 meshing with the ring gear 36, in the left axial direction as seen in FIG. 1, due to the left-hand helix of the teeth 26a. At the same time, a radial force $F_{SR}$ acts on the large-diameter pinion 24 in the radially inward direction, due to a pressure angle of the teeth 24a, while a radial force $F_{RR}$ acts on the small-diameter pinion 26 in the radially inward direction, due to a pressure angle of the teeth 26a. The radial force $F_{SR}$ is represented by $F_S \cdot \tan\alpha_S$, where "$F_S$" represents a force which is transferred from the sun gear 32 to the teeth 24a of the large-diameter pinion 24 in the circumferential direction of the gear 24, and "$\alpha_S$" represents the pressure angle of the teeth 24a. The thrust force $F_{SS}$ is represented by $F_S \cdot \tan\beta_S$, where "$\beta_S$" represents the helix angle of the tooth 24a. The radial force $F_{RR}$ is represented by $F_R \cdot \tan\alpha_R$, where "$F_R$" represents a reaction force which is transferred from the ring gear 36 to the teeth 26a of the small-diameter pinion 26 in the circumferential direction of the gear 26, and "$\alpha_R$" represents the pressure angle of the teeth 26a. The thrust force $F_{RS}$ is represented by $F_R \cdot \tan\beta_R$, where "$\beta_R$" represents the helix angle of the teeth 26a.

Figure 6:
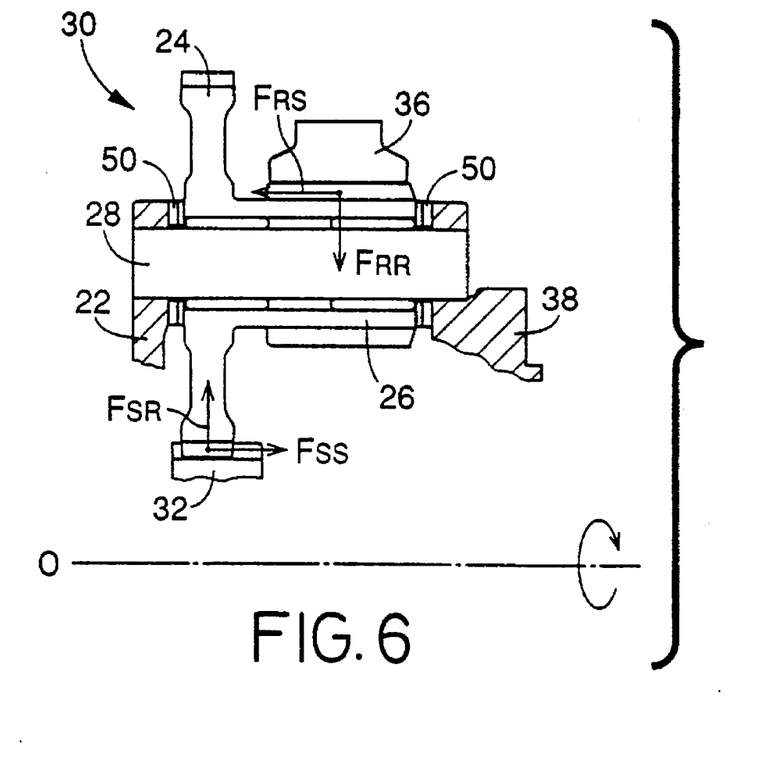
FIG. 6 is a view showing forces which act on the gears of the composite pinion gear of FIG. 5 in the axial and radial direction.

FIG. 6 indicates the forces $F_{SR}$, $F_{SS}$, $F_{RR}$ and $F_{RS}$ described above. The radial forces $F_{SR}$ and $F_{RR}$ which are generated due to the pressure angles of the teeth 24a, 26a act as a moment that rotates the composite pinion 30 in the clockwise direction about a centerline normal to the plane of FIG. 6, while the thrust forces $F_{SS}$ and $F_{RS}$ which are generated due to the helix angles of the teeth 24a, 26a act as a moment which rotates the composite pinion gear 30 in the counterclockwise direction about the centerline normal to the plane of FIG. 6. Hence, these two moments offset each other, and the composite or overall moment which acts on the gear 30 is relatively small. Accordingly, the amount of local uneven wear of the pinion shaft 28 and the amount of deformation of the carrier 22 which supports the pinion shaft 28 are reduced, whereby the durability of the pinion shaft 28 and carrier 22 is improved. The reduced amount of deformation of the carrier 22 permits a relatively high degree of parallelism of the pinion shaft 28 with the centerline O or the axes of the sun and ring gears 32, 36, which assures correct engagement of the large- and small-diameter pinions 24, 26 with the sun and ring gears 32, 36, and reduced operating noise of the power transmission system 10. For the above-indicated two moments to offset each other, it is desirable to determine the directions of the helix of the teeth 24a, 26a so that the thrust forces $F_{SS}$ and $F_{RS}$ generated due to the helix angles act in the axially opposite directions toward each other so as to offset each other, when the vehicle is running in the forward direction. In FIG. 6, hatching is omitted to clearly show the arrows indicating the directions of the forces.

In the present embodiment, the thrust force $F_{SS}$ is equal to the thrust force $F_{RS}$, since the lead of the teeth 24a of the large-diameter pinion 24 is equal to that of the teeth 26a of the small-diameter pinion gear 26. That is, substantially the same amounts of torque T act on the pinions 24, 26 in the opposite directions. The torque T is represented by the following equation (1):

$$T = r_S \cdot F_S = r_R \cdot F_R \tag{1}$$

where, $r_S$: radius of the pinion 24
$r_R$: radius of the pinion 26

Figure 7:
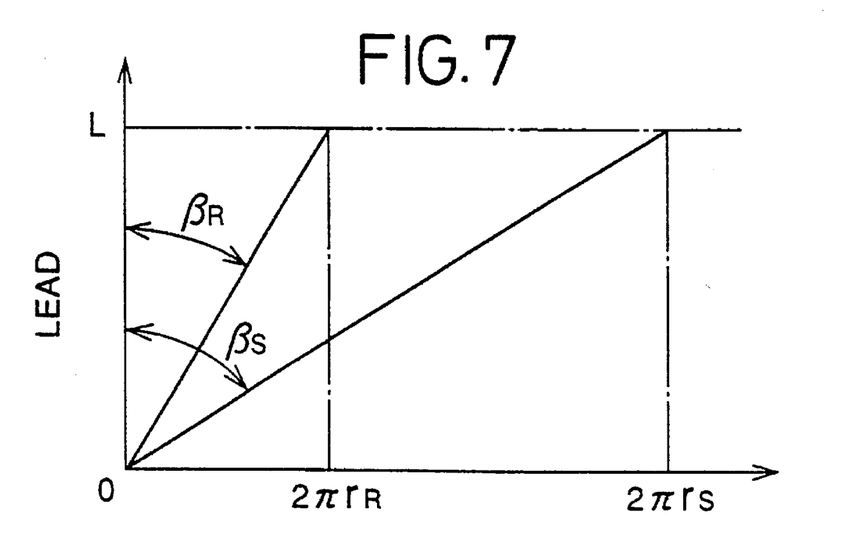
FIG. 7 is a graph for explaining relationships between lead L, helix angle $\beta_S$, $\beta_R$, and radius $r_S$, $r_R$ of the gears of the composite pinion gear of FIGS. 5 and 6.

The thrust forces $F_{SS}$ and $F_{RS}$ are represented by the following equations (2) and (3), respectively, according to a relationship as indicated in FIG. 7:

$$\begin{aligned} F_{SS} &= F_S \cdot \tan\beta_S = F_S \cdot (2\pi r_S/L) \\ &= T \cdot (2\pi/L) \end{aligned} \tag{2}$$

$$\begin{aligned} F_{RS} &= F_R \cdot \tan\beta_R = F_R \cdot (2\pi r_R/L) \\ &= T \cdot (2\pi/L) \end{aligned} \tag{3}$$

where, L: lead of the teeth 24a, 26a

Thus, the forces $F_{SS}$ and $F_{SR}$ are equal to each other. Therefore, the overall thrust force acting on the composite pinion gear 30 is substantially zero, and the required strength and rigidity of the carrier 22 supporting the gear 30 are reduced, and the power transmission system 10 can be made simpler in construction and is available at a reduced cost. Further, the deflection or deformation of the carrier 22 due to the thrust force is eliminated, and the parallelism between the axis of the pinion shaft 28 and the axis O of the sun and ring gears 32, 36 is maintained at a relatively high level, enabling the teeth 24a, 26a of the large- and small-diameter pinions 24, 26 to correctly and smoothly engage the sun and ring gears 32, 36, and thereby assuring reduced operating noise and improved power transmitting efficiency of the system 10. The present arrangement does not require thrust bearings between the composite pinion gears 30 and the carrier 22 (differential casing portion 22a). That is, the provision of the washers 50 as in the present embodiment is sufficient. In this case, the speed reducing device 12 is available at a reduced cost. It is noted that the graph of FIG. 7 indicates the relationship among the perimeter or circumference $2\pi r_S$, $2\pi r_R$ of the pinions 24, 26, the helix angles $\beta_S$, $\beta_R$ of the teeth 24a, 26a and the lead L of the teeth 24a, 26a.

Since the lead L of the large-diameter pinion 24 is equal to that of the small-diameter pinion 26, the individual composite pinion gears 30 can be axially moved independently of each other while being rotated about their axes while the sun and ring gears 32, 36 are held stationary. Therefore, upon application of a torque to the power transmission system 10, the composite pinion gears 30 are moved to respective axial positions within the distances of the axial plays or clearances, which axial positions permit smooth and adequate engagement of the teeth 24a, 26a of the pinions 24, 26 with the teeth of the sun and ring gears 32, 36. Thus, the present arrangement prevents inadequate engagement of the teeth 24a, 26a with the teeth of the sun and ring gears 32, 36 due to dimensional errors of the end faces of the carrier 22. Thus, the present arrangement assures consistently adequate and smooth tooth engagement of the pinions 24, 26 of the composite pinion gears 30 with the sun and ring gears 32, 36, thereby avoiding otherwise possible increase in the operating noise and deterioration of the power transmitting efficiency of the system 10.

If the helix angles $\beta_S$ and $\beta_R$ are determined independently of each other, the thrust force $F_{SS}=F_S \cdot \tan\beta_S$ and the thrust force $F_{RS}=F_R \cdot \tan\beta_R$ do not completely offset each other. Therefore, the composite pinion gear 30 is moved in one axial direction by the overall thrust force, whereby the carrier 22 supporting the composite pinion gears 30 is required to have an increased mechanical strength. Further, the overall thrust force may cause deflection or deformation of the carrier 22, leading to deteriorated parallelism between the composite pinion gears 30 and the sun and ring gears 32, 36, inadequate engagement thereof, and increased noise and lowered power transmitting efficiency of the transmission system 10. If the specifications of the large-diameter pinion 24 are determined independently of those of the small-diameter pinion 26, an axial movement of one composite pinion gear 30 will cause rotation of the sun and ring gears 32, 36. If the individual composite pinion gears 30 are axially moved by different distances, the teeth 24a, 26a of the pinion gears 30 and the teeth of the sun and ring gears 32, 36 may have inadequate meshing engagement due to back face contact or extremely high local surface pressure, adversely influencing the gear noise, power transmitting efficiency and mechanical strength of the gears 30. It is difficult to establish the same amount of axial clearance for all of the composite pinion gears 30. If one of the pinion gears 30 is brought into abutting contact with the end face of the carrier 22 (washer 50), the other pinion gears 30 cannot be axially moved, and the overall thrust force acts on pinion gears 30, causing the above problem.

It is noted that when the lead of the teeth 24a of the large-diameter pinion gear 30 is made equal to that of the teeth 26a of the small-diameter pinion 26, the helix angle $\beta_R$ of the teeth 26a is made smaller than the helix angle $\beta_S$ of the teeth 24a of the large-diameter pinion 24. Therefore, the axial dimension of the composite pinion gears 30 should be increased to increase the tooth engagement ratio and mechanical strength. Therefore, if the differential gear device 14 of bevel gear type was disposed next to the speed reducing device 12 of planetary gear type, the required axial dimension of the power transmission system 10 along the centerline O would be undesirably increased. In the present present embodiment, however, the differential gear device 14 partially overlaps the speed reducing device 12, an increase in the axial dimension of the composite pinion gears 30 will not necessarily cause an increase in the overall axial dimension of the power transmission system 10. This overlapping arrangement is possible owing to the alternate arrangement of the composite pinion gears 30 and the driving bevel gears 54, which is possible because the number of the composite pinion gears 30 is equal to that of the bevel gears 54.

Figure 8:
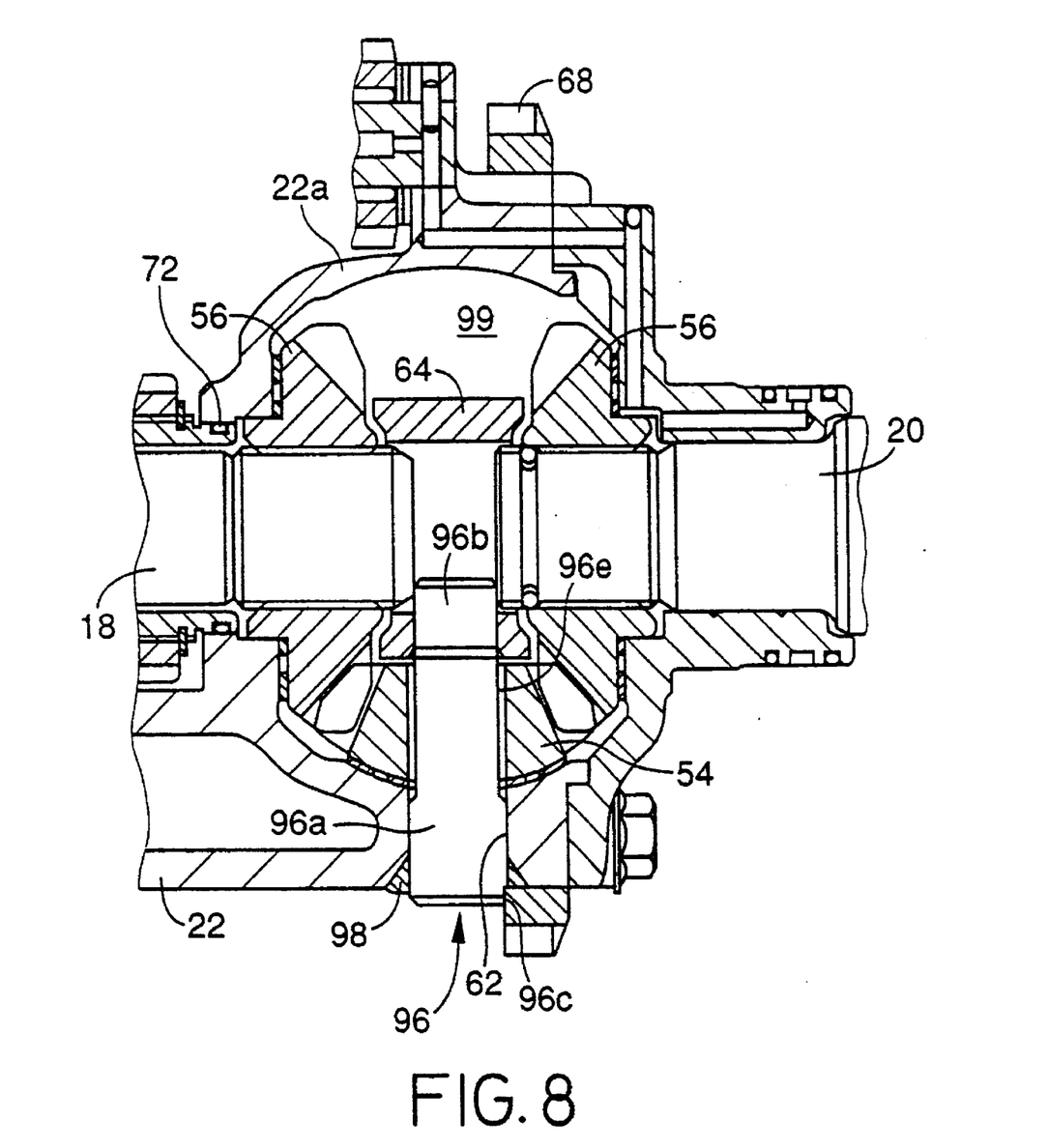
FIG. 8 is a view corresponding to that of FIG. 2, showing another embodiment of the invention, wherein a modified form of sealing is provided between the gear shaft of the differential gear device and a differential casing portion of a carrier of a speed reducing device of the power transmission system of FIG. 1.

Referring next to FIG. 8, another embodiment of the present invention will be described.

In the first second embodiment of FIGS. 1–7, the O-ring 70 is used for substantially fluid-tight sealing between each gear shaft 52 and the radial hole 62 in the differential casing portion 22a. In the present second embodiment of FIG. 8, a liquid gasket 98 is substituted for the O-ring 70, for substantially fluid-tight sealing between each gear shaft 96 and the differential casing portion 22a. The liquid gasket 98 may be a so-called "FIPG gasket" or "formed-in-place-gasket". Like the gear shaft 52, the gear shaft 96 has a body portion 96a, an inner end portion 96b, a cutout 96c and a pair of flat faces 96e. However, the body portion 96a does not have an annular groove as indicated at 52d in FIG. 3(b). In this second embodiment, the outer open end portion of the radial hole 62 is tapered or countersunk, so that the countersunk end portion is filled with the material of the liquid gasket 98. In the present second embodiment, the differential casing portion 22a of the carrier 22, differential cover 40 and liquid gasket 98 cooperate to define a substantially fluid-tight enclosure 99 within the casing of the differential gear device 14.

While the present invention has been described above in detail in its presently preferred embodiments by reference to the accompanying drawings, it is to be understood that the present invention is not limited to the details of the illustrated embodiments, but may be otherwise embodied.

For instance, the principle of this invention is applicable to the power transmission system 100 shown in FIG. 9. In this case, an O-ring or a liquid gasket as used in the first and second embodiments of FIGS. 2 and 8 may be used for substantially fluid-tight sealing between the differential casing portion 112a and each gear shaft 152 which is positioned and fixed by a pin 154. In this case, the oil reservoir 146 can be eliminated.

While the O-ring 70 or liquid gasket 98 is used in the illustrated embodiments, substantial fluid-tight sealing between each gear shaft 52, 96 and the differential casing portion 22a can be established by controlling a clearance therebetween to be small enough to substantially inhibit leakage of the lubricating oil from the enclosure 73, 99.

In the illustrated embodiments of FIGS. 2 and 8, the sealing ring 72 is provided for substantial fluid-tight sealing between the differential casing portion 22a and the motor shaft 16, this sealing member 72 may be eliminated. That is, since the sealing ring 72 is located a considerable distance above the bottom of the enclosure 73, 99, the absence of the sealing ring 72 would not cause complete leakage of the lubricating oil from the fluid-tight enclosure 73, 99. Thus, the principle of the present invention requires substantial fluid-tight sealing between the differential casing portion 22a and each gear shaft 52, 96.

Although the principle of the present invention is applied to the differential gear device 14 of bevel gear type, the principle is equally applicable to other types of differential gear device or power transmission systems other than the illustrated power transmission system 10.

Although the illustrated embodiment uses the three composite pinion gears 30 in the speed reducing device 12 and the same number of the driving bevel gears 54 in the differential gear device 14, the numbers of the composite pinion gears 30 and driving bevel gears 54 may be suitably selected, provided that one of these numbers is a divisor of the other number, except "1". For instance, two, four or five composite pinion gears 30 and the same number of driving bevel gears 54 may be provided. In this case, the above-indicated divisor is equal to "2", "4" or "5". Alternatively, four composite pinions 30 and two driving bevel gears 54 may be provided. In this case, the divisor is equal to "2", i.e., the number of the bevel gears 54. The two bevel gears 54 may be arranged such that one of the bevel gears 54 is disposed between one pair of the composite pinion gears 30 while the other bevel gear 54 is disposed between the other pair of the composite pinion gears 30, as viewed in the circumferential direction of the ring gear 36.

In the illustrated embodiment, the speed reducing device 12 includes the composite pinion gears 30, and the ring gear 36 functions as the reaction element so that a rotary motion transferred from the motor shaft 16 to the sun gear 32 is outputted through the carrier 22 to the differential gear device 14 at a predetermined speed reduction ration. However, the principle of the present invention is equally applicable to a power transmission system in which the sun gear functions as the reaction element.

In the illustrated embodiment, the direction of the helix of the teeth 24a, 26a of the large- and small-diameter pinions 24, 26 is determined depending upon the direction of rotation of the sun gear 32 corresponding to the forward running direction of the vehicle, so that the thrust forces $F_{SS}$ and $F_{RS}$ generated due to the helix act in the opposite axial directions toward each other. However, the direction of the helix of the teeth 24a, 26a may be determined so that the thrust forces $F_{SS}$ and $F_{RS}$ generated due to the helix act in the opposite axial directions away from each other.

Although the teeth 24a, 26a of the large- and small-diameter pinions 24, 26 have the same helix direction and the same amount of lead, the helix angle and/or lead of the teeth 24a may be different from the helix angle and/or lead of the teeth 26a.

It will be understood that the present invention may be embodied with various other changes, modifications and improvements, which may occur to those skilled in the art, without departing from the spirit and scope of the invention defined in the following claims.

What is claimed is:

1. A power transmission system for a motor vehicle, in which all of rotating elements thereof are stopped upon stopping of the vehicle, and which comprises a lubricating device including an oil sump for storing a lubricating oil and a mechanically operated oil pump which is driven by one of said rotating elements to pressurize the lubricating oil received from said oil sump and deliver the pressurized lubricating oil to predetermined lubricating points within the power transmission system, wherein an improvement comprises:

said lubricating device having a substantially fluid-tight enclosure in which said lubricating points are disposed and which stores, in a substantially fluid-tight manner, a mass of said lubricating oil pressurized by and delivered from said mechanically operated oil pump.

2. A power transmission system according to claim 1, further comprising a differential gear device of a bevel gear type which has a casing and a plurality of bevel gears which are disposed in said casing as said lubricating points, said substantially fluid-tight enclosure being defined within said casing.

3. A power transmission system according to claim 2, wherein said differential gear device further comprises a plurality of gear shafts supported by said casing and intersecting an axis of rotation of said power transmission system, and wherein said plurality of bevel gears including a plurality of driving bevel gears freely rotatably mounted on said plurality of gear shafts, respectively, and a plurality of driven bevel gears which are coaxial with said axis of rotation and which mesh with said plurality of driving bevel gears.

4. A power transmission system according to claim 3, wherein said lubricating device further includes sealing means for substantially fluid-tight sealing between said plurality of gear shafts and said casing of said differential gear device.

5. A power transmission system according to claim 4, further comprising an input shaft from which power is received by the power transmission system, and wherein said casing is associated with said input shaft, said lubricating device further including second sealing means for substantial fluid-tight sealing between said input shaft and said casing.

6. A power transmission system for an electric motor vehicle according to claim 3, further comprising a pair of output members for rotating a pair of wheels of the electric motor vehicle, and a speed reducing device of a planetary gear type which has a carrier coaxial with said axis of rotation, and a plurality of pinion gears supported by said carrier rotatably about respective axes substantially parallel to said axis of rotation, said carrier receiving power from an electric motor and transmitting the received power to said differential gear device at a predetermined speed reduction ratio, and wherein said casing of said differential gear device includes a portion which is rotated together with said carrier, said power being transmitted to said pair of output members through said driving bevel gears and said driven bevel gears.

7. A power transmission system according to claim 6, wherein said plurality of pinion gears are equiangularly arranged about said axis of rotation while said plurality of driving bevel gears are equiangularly arranged about said axis of rotation, a first number of said pinion gears and a second number of said driving bevel gears being determined such that one of said first and second numbers is a divisor of the other of said first and second numbers, which divisor is other than "1", said pinion gears and said driving bevel gears being arranged about said axis of rotation such that each of said driving bevel gears is disposed without an interference thereof with any of said pinion gears in a direction of rotation about said axis of rotation, said speed reducing device and said differential gear device being positioned relative to each other such that said speed reducing device and said differential gear device at least partially overlap each other in an axial direction parallel to said axis of rotation.

8. A power transmission system according to claim 7, wherein each of said plurality of pinion gears of said speed reducing device consists of a composite pinion gear (30) consisting of a large-diameter pinion gear and a small-diameter pinion which has a smaller diameter than said large-diameter pinion, said large- and small-diameter pinions being arranged in an axial direction of said composite pinion gear and rotating together when each said composite pinion gear is rotated.

9. A power transmission system according to claim 8, wherein said speed reducing device further includes a sun gear which is rotated by said electric motor about said axis of rotation and which meshes with said large-diameter pinion of each said composite pinion gear, and a stationary ring gear which meshes with said small-diameter pinion of each said composite pinion gear.

10. A power transmission system according to claim 9, wherein teeth of said large-diameter pinion and teeth of said small-diameter pinion have the same direction of helix and the same amount of lead.

* * * * *